United States Patent
Hiratsuka et al.

(10) Patent No.: US 8,964,154 B2
(45) Date of Patent: Feb. 24, 2015

(54) LIQUID CRYSTAL DISPLAY DEVICE

(71) Applicant: Japan Display East Inc., Mobara-shi, Chiba (JP)

(72) Inventors: Takato Hiratsuka, Chiba (JP); Osamu Itou, Hitachi (JP)

(73) Assignee: Japan Display Inc., Tokyo (JP)

( * ) Notice: Subject to any disclaimer, the term of this patent is extended or adjusted under 35 U.S.C. 154(b) by 126 days.

(21) Appl. No.: 13/733,931

(22) Filed: Jan. 4, 2013

(65) Prior Publication Data
US 2013/0182211 A1    Jul. 18, 2013

(30) Foreign Application Priority Data
Jan. 17, 2012 (JP) ................... 2012-006899

(51) Int. Cl.
 *G02F 1/1343* (2006.01)
 *G02F 1/1333* (2006.01)
(52) U.S. Cl.
 CPC .... *G02F 1/134336* (2013.01); *G02F 1/133377* (2013.01); *G02F 2001/134381* (2013.01)
 USPC .......................................... 349/141; 349/156
(58) Field of Classification Search
 USPC ................................. 349/141, 156
 See application file for complete search history.

(56) References Cited

U.S. PATENT DOCUMENTS

2008/0007687 A1* 1/2008 Konno ............................ 349/156

FOREIGN PATENT DOCUMENTS

JP    6-214244    8/1994

* cited by examiner

*Primary Examiner* — James Dudek
(74) *Attorney, Agent, or Firm* — Antonelli, Terry, Stout & Kraus, LLP.

(57) ABSTRACT

A liquid crystal display device using a wall electrode facilitates enclosing of liquid crystal and improves transmittance. The liquid crystal display device includes a plurality of pixels arranged in a matrix. Each of the pixels includes large walls, a small wall, a TFT-side electrode, and a wall electrode. The large walls extend in a long-side direction of the pixel at both ends of the pixel. The small wall extends parallel to the large walls between the large walls. The TFT-side electrode is formed on the small wall. The wall electrode is formed on a side surface of the large wall and formed between the large wall and the small wall. The large walls are separated between the pixels in the long-side direction. The small wall which has a height lower than the large walls is arranged between the separated large walls.

14 Claims, 8 Drawing Sheets

----- ELECTRIC FIELD FOR FORWARD TWIST DIRECTION
......... ELECTRIC FIELD FOR REVERSE TWIST DIRECTION

BENT PORTION LENGTH in k

LIQUID CRYSTAL DISPLAY DEVICE

CLAIM OF PRIORITY

The present application claims priority from Japanese patent application JP2012-006899 filed on Jan. 17, 2012, the content of which is hereby incorporated by reference into this application.

BACKGROUND OF THE INVENTION

1. Field of the Invention

The present invention relates to a liquid crystal display device using a wall electrode. More particularly, the present invention relates to a liquid crystal display device that facilitates enclosing of liquid crystal and improves transmittance.

2. Description of the Related Art

A liquid crystal display device has features of high display quality, thinness and lightness, low power consumption, and similar feature. Accordingly, the liquid crystal display device is widely used from a small mobile terminal to a large television.

On the other hand, the liquid crystal display device has a problem with a viewing angle characteristic. In order to ensure a wide viewing angle, an IPS (In-Plane Switching) mode liquid crystal display device has been proposed. In the IPS mode, liquid crystal molecules are horizontally aligned. In this state, an electric field in a direction parallel to a substrate is applied to rotate the liquid crystal molecule in a horizontal plane so as to control backlight. Thus, an image is displayed.

Japanese Patent Application Laid Open Publication No. 6-214244 discloses a liquid crystal display device that includes pixels in an m×n matrix, an active element inside of the pixel, a driving unit that applies a predetermined voltage waveform, and an electrode pair that keeps a certain gap between upper and lower substrates in the pixel. This liquid crystal display device has a predetermined structure that can control an alignment state of the liquid crystal molecule by applying an electric field parallel to a substrate surface across the above-described electrode pair so as to modulate a light (see Abstract).

SUMMARY OF THE INVENTION

In order to ensure a liquid crystal display device that includes an electrode pair between upper and lower substrates and controls an alignment state of a liquid crystal molecule by applying an electric field parallel to a substrate surface across the electrode pair, the inventor examined the following liquid crystal display device in advance of the present invention. This liquid crystal display device includes a drain line and a gate line. The drain line is arranged in a lower layer of a wall electrode that is arranged in a long-side direction of a pixel. The gate line is arranged in a pixel end portion in a short-side direction of the pixel. However, the wall electrodes coupled between the pixels in the long-side direction completely separates a liquid crystal layer in the short-side direction, thus enclosing of the liquid crystal becomes difficult. This decreases in yield in mass production of a liquid crystal panel and leads to cost increase.

Assume that an electrode that blocks influence of electric potentials of the drain line and the gate line is not disposed on these drain line and gate line. When black and white are alternately displayed in the short-side direction and the long-side direction of the pixel, these electric potentials have the following influence. A pixel displaying white has reduced transmittance in white display while a pixel displaying black has increased transmittance in black display. In the case of a structure that has small pixel spacing in the long-side direction of pixels, when black and white are alternately displayed, influence of the electric potential of an adjacent pixel increases transmittance in black display of a pixel displaying black and decreases transmittance in white display of a pixel displaying white. Thus, influence of the electric potential around the pixel from the drain line, the gate line, the adjacent pixel, and similar member degrades display characteristics.

In the case of a multi-domain structure, a region with liquid crystal alignment of forward twist and a region with liquid crystal alignment of reversed twist are mixed in a pixel end portion. This produces a domain. This causes a reduction in transmittance in white display of the pixel end portion, thus reducing transmittance in white display of the whole pixel.

An object of the present invention is to facilitate enclosing liquid crystal and improve transmittance in a liquid crystal display device using a wall electrode.

In order to address the aforementioned problems, a liquid crystal display device according to the present invention includes a plurality of pixels arranged in a matrix. Each of the pixels includes large walls, a small wall, a TFT-side electrode, and a wall electrode. The large walls extend in a long-side direction of the pixel at both ends of the pixel. The small wall extends parallel to the large walls between the large walls. The small wall has a height lower than the large walls. The TFT-side electrode is formed on the small wall. The wall electrode is formed on a side surface of the large wall and formed between the large wall and the small wall. The large walls are separated between the pixels in the long-side direction. The small wall which has a height lower than the large walls is arranged between the separated large walls.

In the liquid crystal display device according to the present invention, each of the pixels may include the small wall that is continuously arranged at the both ends of the pixel. The small wall extends in the short-side direction of the pixel.

The liquid crystal display device according to the present invention may include a drain line in the long-side direction of the pixel and a gate line in the short-side direction of the pixel, and may also include a common electrode formed via the small wall in an upper layer of the drain line and the gate line.

In the liquid crystal display device according to the present invention, the common electrode may be coupled to common electrodes of adjacent pixels in the short-side direction and the long-side direction of the pixel.

In the liquid crystal display device according to the present invention, a common electrode may be formed on a gate line in the short-side direction of the pixel via an interlayer insulating film.

In the liquid crystal display device according to the present invention, a storage capacitor electrode may face a planar electrode across an interlayer insulating film to form a capacitive element. The storage capacitor electrode is coupled to the TFT-side electrode and formed in a planar direction of a substrate. The planar electrode extends in a planar direction of a substrate from the wall electrode.

A liquid crystal display device according to the present invention includes a plurality of pixels arranged in a matrix. Each of the pixels includes large walls, a small wall, a TFT-side electrode, a wall electrode, and a bent portion. The large walls extend in a long-side direction of the pixel at both ends of the pixel. The small wall extends parallel to the large walls between the large walls and has a height lower than the large walls.

The TFT-side electrode is formed on the small wall as a common electrode. The wall electrode is formed on a side surface of the large wall and formed between the large wall and the small wall as a source electrode. The bent portion is formed in an end portion of the small wall and faces the large wall. The common electrode is formed in the bent portion.

In the liquid crystal display device according to the present invention, the bent portion may include a distal end that has a shape in an acute angle or a round shape.

In the liquid crystal display device according to the present invention, a distance between the large wall and the small wall may be defined as k, and the bent portion may have a length L that is defined by k/4<L<3k/4.

In the liquid crystal display device according to the present invention, a storage capacitor electrode may face a planar electrode across an interlayer insulating film to constitute a capacitive element. The storage capacitor electrode is coupled to the TFT-side electrode and formed in a planar direction of a substrate. The planar electrode extends in a planar direction of a substrate from the wall electrode.

In the liquid crystal display device according to the present invention, a common electrode may be formed on a gate line in the short-side direction of the pixel via an interlayer insulating film.

The present invention ensures stable enclosing of the liquid crystal in production of the liquid crystal display device and cost reduction by improving yield. The present invention also allows blocking influence of the electric potentials of the drain line, the gate line, and the adjacent pixel, thus reducing an increase in transmittance in black display and a decrease in transmittance in white display. The present invention further ensures reduction in the domain in the pixel end portion and reduces the dark region, thus achieving high transmittance in the whole pixel.

DETAILED DESCRIPTION OF THE INVENTION

Figure 1:
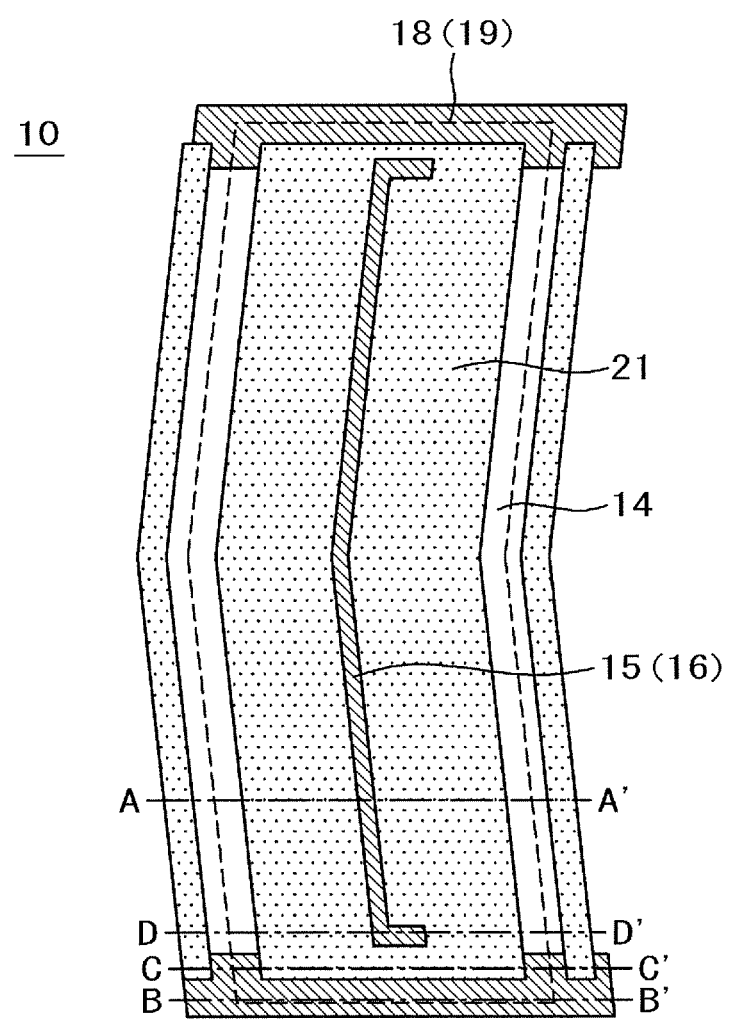
FIG. 1 is a diagram illustrating a planar structure of a pixel according to Embodiment 1 of the present invention.

An embodiment of the present invention will be described below by referring to the accompanying drawings. In the all drawings to describe the embodiment, like reference numerals designate corresponding or identical elements to those of the embodiment, and therefore such elements will not be further elaborated here.

Embodiment 1

Figure 14:
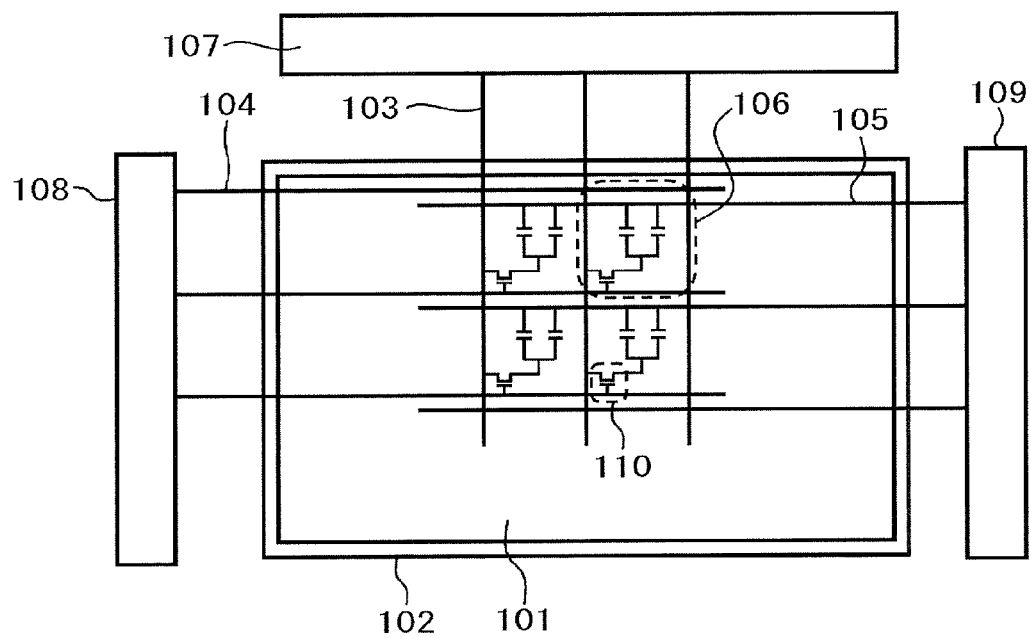
FIG. 14 is a diagram illustrating an exemplary equivalent circuit of a liquid crystal display device to which the present invention is applied.

First, FIG. 14 illustrates an exemplary equivalent circuit of a liquid crystal display device to which the present invention is applied. A scanning line 104 and a signal line 103 are wired in a matrix on a substrate 102. Each intersection point of the scanning line 104 and the signal line 103 is coupled to a pixel 106 via a Thin Film Transistor (TFT) element 110. The scanning line 104 and the signal line 103 are respectively coupled to a scan driving circuit 108 and a signal driving circuit 107 to apply voltages to the scanning line 104 and the signal line 103. On the substrate 102, a common line 105 is disposed parallel to the signal line 103 to apply a common voltage to all pixels by a common voltage generation circuit 109. Liquid crystal composition is enclosed between the substrate 102 and a substrate 101, thus constituting the liquid crystal display device as a whole.

Figure 2:
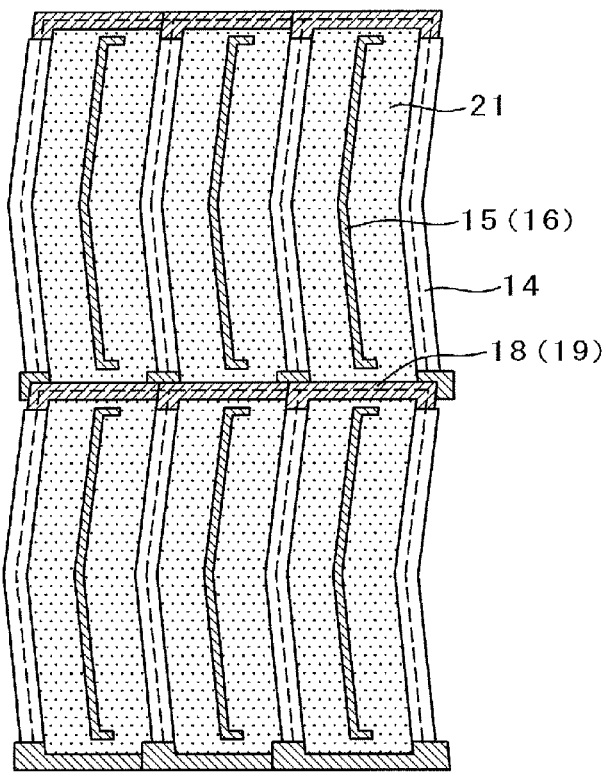
FIG. 2 is a diagram illustrating a planar structure of six pixels according to Embodiment 1 of the present invention.
Figure 3:
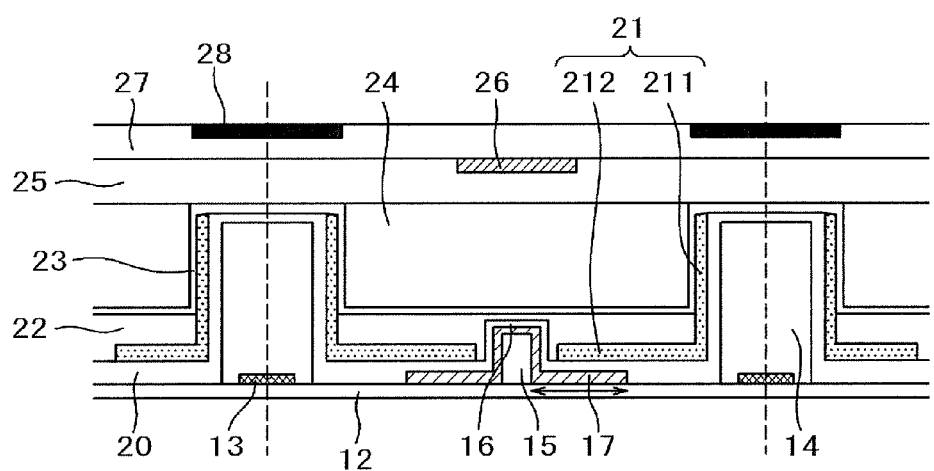
FIG. 3 is a cross-sectional view taken along the plane A-A' of FIG. 1.
Figure 4:
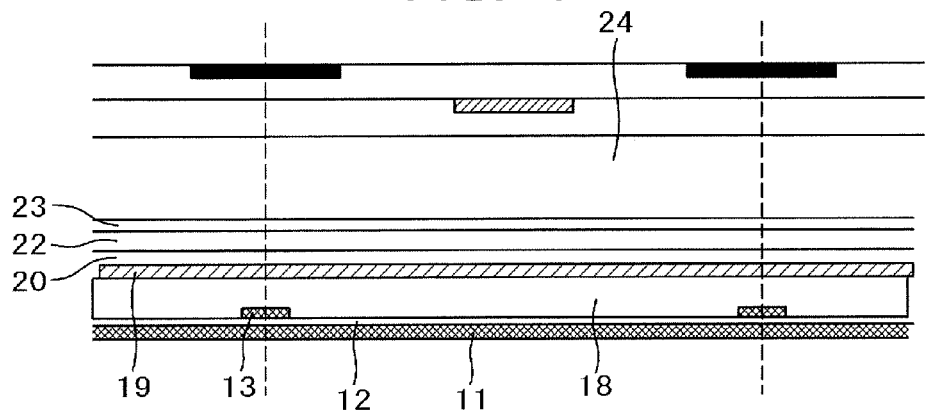
FIG. 4 is a cross-sectional view taken along the plane B-B' of FIG. 1.
Figure 6:
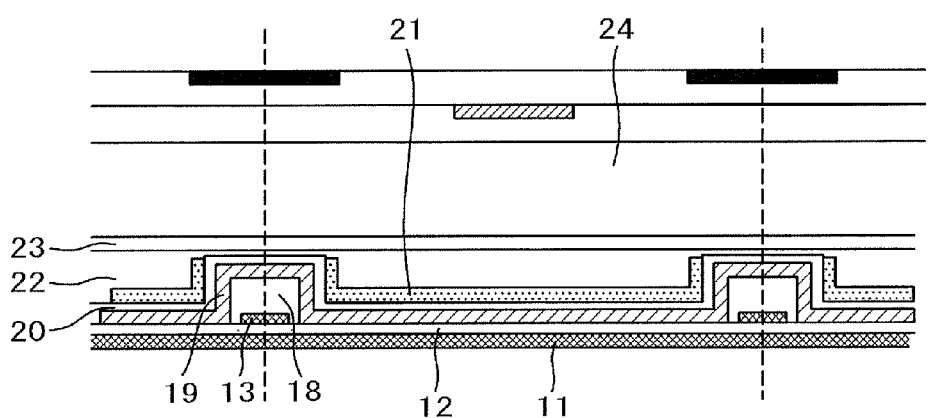
FIG. 6 is a cross-sectional view taken along the plane C-C' of FIG. 1.
Figure 7:
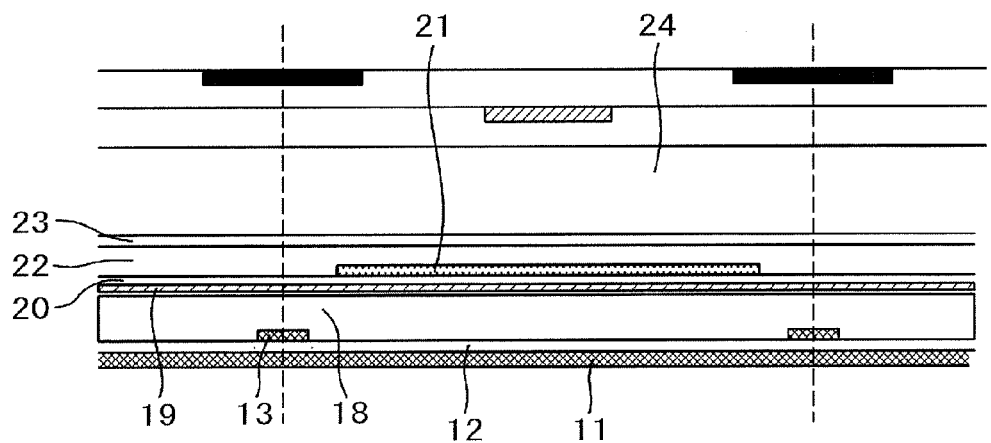
FIG. 7 is another cross-sectional view taken along the plane C-C' of FIG. 1.
Figure 8:
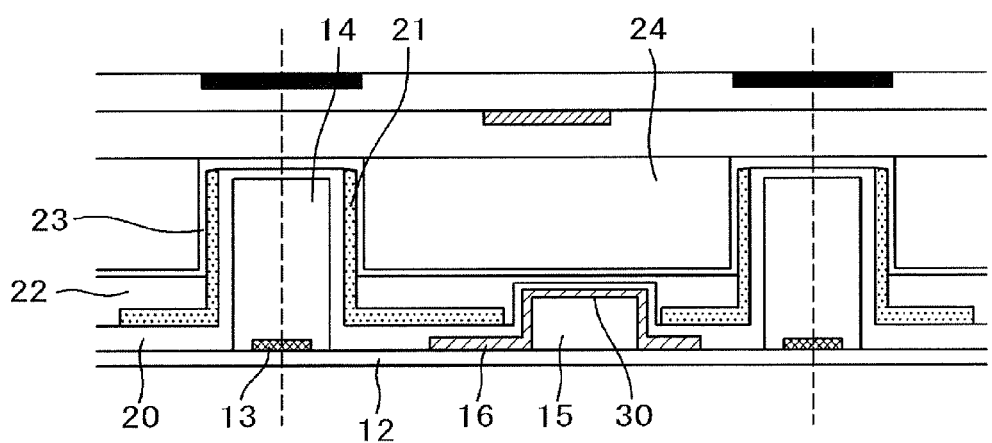
FIG. 8 is a cross-sectional view taken along the plane D-D' of FIG. 1.

FIG. 1 is a diagram illustrating a planar structure of one pixel according to Embodiment 1 of the present invention. FIG. 2 is a diagram illustrating a planar structure of six pixels of FIG. 1. FIG. 3 is a cross-sectional view taken along the plane A-A' of FIG. 1. FIG. 4 (FIG. 5) is a cross-sectional view taken along the plane B-B' of FIG. 1. FIG. 6 (FIG. 7) is a cross-sectional view taken along the plane C-C' of FIG. 1. FIG. 8 is a cross-sectional view taken along the plane D-D' of FIG. 1. As illustrated in FIG. 1, the planar structure of the pixel according to the present invention has different cross-sectional views in the center portion (the plane A-A') and an end portion of the pixel. The drawing of the planar structure described below illustrates a structure of an electrode viewed from a liquid crystal layer.

First, the plane A-A' in the center portion of the pixel will be described. As illustrated in FIG. 3, the cross-sectional view taken along the plane A-A' includes a large wall structure (hereinafter referred to as a large wall 14) disposed at both ends of the pixel. This structure forms a wall-shaped electrode 211, which covers a side surface of this large wall 14 with an electrode, and a planar electrode 212 that extends in a planar direction from a surface where the wall-shaped electrode 211 is in contact with the substrate. These wall-shaped electrode 211 and planar electrode 212 are electrically coupled. A combination of the wall-shaped electrode 211 and the planar electrode 212 is referred to as a wall electrode 21. Between the large wall structures at a pixel boundary, a wall structure (hereinafter referred to as a small wall 15) that has a height lower than the large wall structure is disposed. A common electrode (hereinafter referred to as a TFT-side electrode 16) is formed to cover the small wall 15. Additionally, a common electrode (hereinafter referred to as a storage capacitor electrode 17) is formed from a surface in contact with the substrate of the small wall 15 in the planar direction. The planar electrode 212 of the above-described wall electrode 21 is formed in an upper layer of the storage capacitor electrode 17 via an interlayer insulating film 20. An insulating film 22 and an alignment film 23 are disposed between the planar electrode 212 and a liquid crystal layer 24. Between the wall electrodes 21 at the pixel boundary, a pair of electrodes (the TFT-side electrode 16 and a CF-side electrode 26 (hereinafter, a combination of both electrodes is referred to as pseudo wall electrodes) is disposed. While in this embodiment, the wall electrodes 21 at both ends of the pixel are formed as source electrodes and the pseudo wall electrodes are formed as the common electrodes, the wall electrodes at both ends of the pixel may be the common electrodes and the pseudo wall electrodes may be the source electrodes. Here, the small wall is a wall that has a height equal to or more than at least 1 μm. The one pixel includes wall structures with two kinds of heights that are the large wall 14 and the small wall 15.

Next, a cross-sectional view taken along the plane B-B' in FIG. 4 will be described. As illustrated in FIG. 4, the plane A-A' in the center portion of the pixel includes the large wall 14 formed in the upper layer of the drain line 13. In contrast, the plane B-B' includes a common electrode 19 disposed via a small wall 18 in an upper layer of a drain line 13 and a gate line 11. A reason for forming the small wall 18 between the pixels in the long-side direction of the pixel is that the liquid crystal layer is coupled to not only an adjacent pixel in the long-side direction of the pixel but also an adjacent pixel in the short-side direction so as to easily enclose the liquid crystal. There are two reasons why the upper layer of the drain line 13 in the plane B-B' is not a thin interlayer insulating film but a small wall. One of the reasons is that forming the small wall 18 in the upper layer of the drain line 13 and the gate line 11 allows significantly separating the common electrode 19 from the drain line 13 and the gate line 11. This reduces capacitance (hereinafter referred to as parasitic capacitance) parasitic to the drain line 13 and the gate line 11, thus easily transmitting a signal. The other reason is that the small wall 18 can be formed similarly to the small wall 15 disposed between the large wall 14 at the both ends of the pixel. This eliminates the need for adding another layer. In view of this, the small wall disposed in the upper layer of the drain line and the gate line in the plane B-B' of the pixel end portion ensures facilitated enclosing of the liquid crystal, reduction of the parasitic capacitance to the drain line and the gate line, and reducing increase in the number of layers.

The common electrode 19 has, as illustrated in FIG. 2, a structure where the common electrodes 19 are coupled in the long-side direction and the short-side direction of the pixel. The source electrode that functions as the wall electrode 21 is formed via the interlayer insulating film 20 in an upper layer of the common electrode 19. The common electrode 19 is formed in an upper layer of the small wall 18 that is disposed on the drain line 13 and the gate line 11. This electrode structure includes the upper layer of the drain line and the gate line where the common electrode or the source electrode always exists. These electrodes always block influence of the electric potentials of the drain line and the gate line. Besides, regarding the electric potential around the pixel, it is necessary to consider influence of the electric potential of an adjacent pixel when black and white are alternately displayed in the long-side direction of the pixels. Regarding this problem, the structure according to the present invention couples the common electrode 19 to the adjacent pixel. Thus, when black and white are alternately displayed in the long-side direction of the pixels, the common electrode can block influence (hereinafter defined as influence of the electric potential of the adjacent pixel) of the electric potential of the pixel displaying white on the pixel displaying black. This reduces increase in transmittance in black display by influence of the electric potential of the adjacent pixel. Additionally, the common electrode is coupled to the adjacent pixel in the long-side direction and the short-side direction of the pixel. Open circuit in one portion does not interrupt supply of a signal. This leads to improvement in yield. As described above, the present invention ensures facilitated enclosing of the liquid crystal, reduction of the parasitic capacitance to the drain line and the gate line, reducing increase in the number of layers, and reducing influence of the electric potential of the adjacent pixel, and improves yield in manufacturing process.

Figure 5:
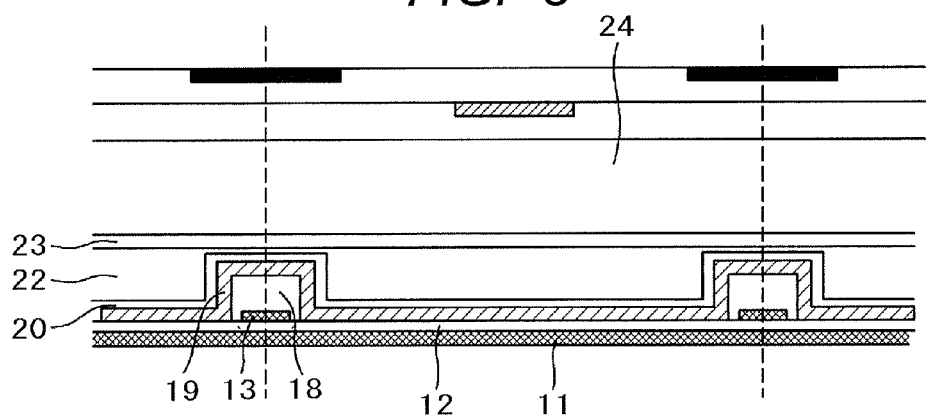
FIG. 5 is another cross-sectional view taken along the plane B-B' of FIG. 1.

If the plane B-B' employs the structure in FIG. 5 instead of the structure in FIG. 4, the similar effects are provided. FIG. 5 is a cross-sectional view taken along the plane B-B' of FIG. 1. In this structure, the small wall 18 is arranged in the upper layer of the drain line 13 and the common electrode 19 is formed in the upper layer of the small wall 18 and the upper layer of the gate line 11. This structure couples the liquid crystal layer 24 to not only the adjacent pixel in the long-side direction but also the adjacent pixel in the short-side direction of the pixel, thus easily enclosing the liquid crystal. Arranging the small wall 18 between the drain line 13 and the common electrode 19 separates the common electrode 19 from the drain line 13, thus reducing parasitic capacitance to the drain line 13. In the upper layer of the gate line 11, the gate line 11 is formed in a lower layer of the drain line 13. Thus, a film thickness between the common electrode 19 and the gate line 11 is thick even if the small wall is not formed. This structure is considered not to result in a large parasitic capacitance. Additionally, as illustrated in FIG. 2, the common electrode 19 formed in the upper layer of the small wall 18 couples the pixels in the long-side direction and the short-side direction of the pixels. Thus, the common electrode 19 between the pixels allows blocking influence of the electric potential of the adjacent pixel in the long-side direction of the pixels. This blocks influence of the electric potential of the adjacent pixel even in the case where black and white are alternately displayed in the long-side direction of the pixels, thus reducing increase in transmittance in black display by influence of the electric potential of the adjacent pixel. Additionally, the common electrode 19 formed in the upper layer of the gate line 11 and the drain line 13 completely blocks influence of the electric potential of, for example, the gate line and the drain line around the pixel. Additionally, the common electrode 19 is coupled to the adjacent pixel in the long-side direction and the short-side direction of the pixel. Thus, open circuit in one portion does not interrupt supply of a signal. This leads to improvement in yield. As described above, the structure in FIG. 5 also ensures facilitated enclosing of the liquid crystal, reduction of the parasitic capacitance to the drain line, reducing increase in the number of layers, and reducing influence of the electric potential of the adjacent pixel, and improves yield.

On the other hand, in the end portion of the pixel, a generated domain reduces transmittance in a portion where the domain is generated. Reduction in domain is necessary to be considered. In the reduction in domain, it is necessary to consider the plane C-C' and the plane D-D' that are structures of the end portion of the pixel. FIG. 6 and FIG. 7 are examples of the plane C-C'. FIG. 7 is an example with the small wall 18 that is continuous between the both ends of the pixel. In contrast, the plane C-C' in FIG. 6 does not include any small wall between the small walls 18 arranged at the both ends of the pixel. However, the small wall does not need to be arranged in a pattern as illustrated in FIG. 7.

FIG. 8 illustrates a cross-sectional structure taken along the plane D-D'. As illustrated in FIG. 8, the structure forms the small wall 15 with a wider width between the large walls 14 at the both ends of the pixel.

Figure 9:
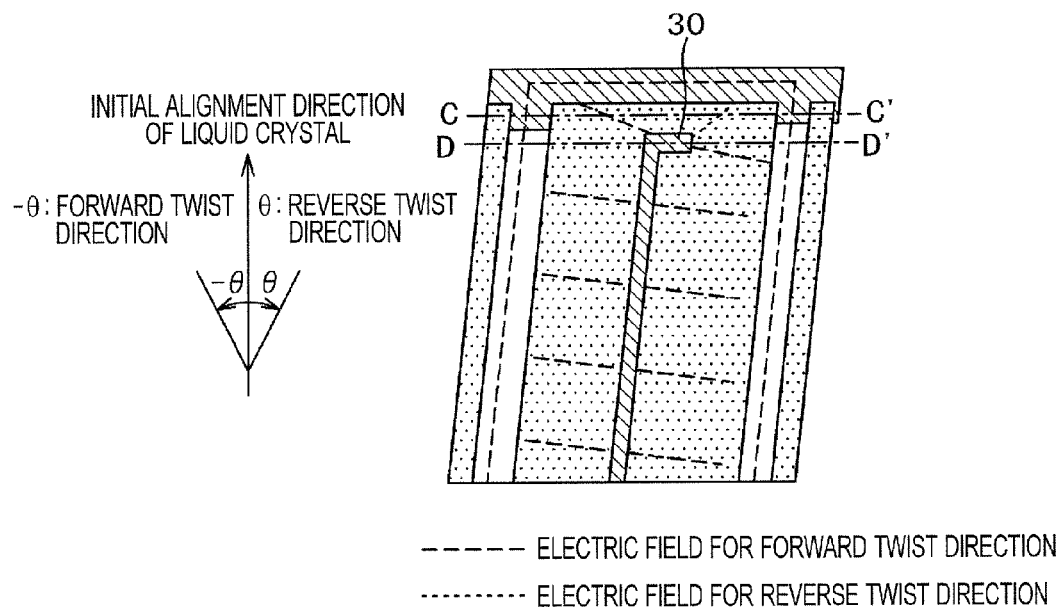
FIG. 9 is a diagram illustrating a direction of an electric field and an initial alignment direction of liquid crystal in a pixel end portion according to Embodiment 1 of the present invention.

FIG. 9 is an enlarged view of a pixel with consideration for the plane C-C' and the plane D-D' at an end of the pixel as described above. A reason for forming this structure will be described by referring to FIG. 9. FIG. 9 illustrates an enlarged view of the end of the pixel according to the present invention, and also illustrates a direction of an electric field and an initial alignment direction of liquid crystal. In the case where the liquid crystal is twisted in a −θ direction with respect to the initial alignment direction, a forward twist occurs. On the other hand, in the case where the liquid crystal is twisted in a θ direction with respect to the initial alignment direction, a reverse twist occurs. Applying an electric field to the liquid crystal aligns the liquid crystal in a direction of the electric field. Domain is generated due to the forward twist and the reverse twist that are mixed in the pixel.

As illustrated in FIG. 9, in the case where the bent small wall is enclosed with the source electrode so as to easily supply the signal potential, an electric field in the reversed twist direction is generated at a distal end of the common electrode and an electric field in the forward twist direction is generated other than at the distal end. Considering this, the inventor examined reduction in domain, and found that it was important for reduction in domain to apply the intense electric field in the forward twist direction to the periphery of the region where the electric field in the reversed twist direction was generated. As illustrated in FIG. 9, in the case where the common electrode formed in the upper layer of the small wall in the pixel end portion has the bent structure, a distance between the source electrode, which is the wall electrode, and the common electrode becomes short. Thus, the electric field in the forward twist direction between the wall electrode and the common electrode becomes intense, compared with a case where the bent portion is not disposed. Even in the case where the bent portion is formed, the electric field in the reversed twist direction is partially generated. However, this intense electric field in the forward twist direction reduces diffusion of the liquid crystal twisted in the reversed twist direction in the pixel end portion, thus reducing the domain. The planes C-C' of FIG. 6 and FIG. 7 both have the same positional relationship between the source electrode and the common electrode, thus ensuing the effect of reduction in domain. The distance between the source electrode, which is the wall electrode, and the common electrode is defined as a distance between the side surface of the wall electrode and the distal end of the bent portion.

These bent portions 30 are preferred to be in the upper layer of the small wall 15 as illustrated in FIG. 8. A reason for this structure is that the insulating film 22 exists between the common electrode and the liquid crystal layer 24 if the small wall is not formed. This generates a voltage drop corresponding to a film thickness of the insulating film 22, thus weakening the electric field in the forward twist direction. In contrast, the common electrode arranged in the upper layer of the small wall 15 prevents the voltage drop, and allows applying an intense electric field in the forward twist direction across the common electrode and the source electrode, which is the wall electrode. Therefore, the bent portion 30 of the common electrode formed in the upper layer of the small wall 15 is effective for reduction of the domain.

Table 1 indicates an effect of reduction in domain according to the present invention. Table 1 is an observation result of the pixel using a length of the bent portion of the small wall as a parameter. As illustrated in Table 1, in the case where the pixel end portion does not include the bent portion, the distance between the source electrode and the common electrode becomes longer and the electric field in the forward twist direction becomes weaker, thus increasing in domain. In contrast, disposing the bent portion with any length was confirmed to reduce the domain that is generated in the pixel end portion. Therefore, making the distance between the source electrode and the common electrode to be smaller and applying the intense electric field in the forward twist direction to the periphery of the domain to be generated was confirmed to reduce the domain. On the other hand, it was found that the long bent portion reduced the domain size but resulted in a dark region enclosed by the common electrode extending in the long-side direction and the common electrode of the bent portion. A reason for this effect is that the long bent portion makes transmission of the electric field to the region enclosed by the common electrodes difficult, thus making movement of the liquid crystal difficult.

Figure 10:
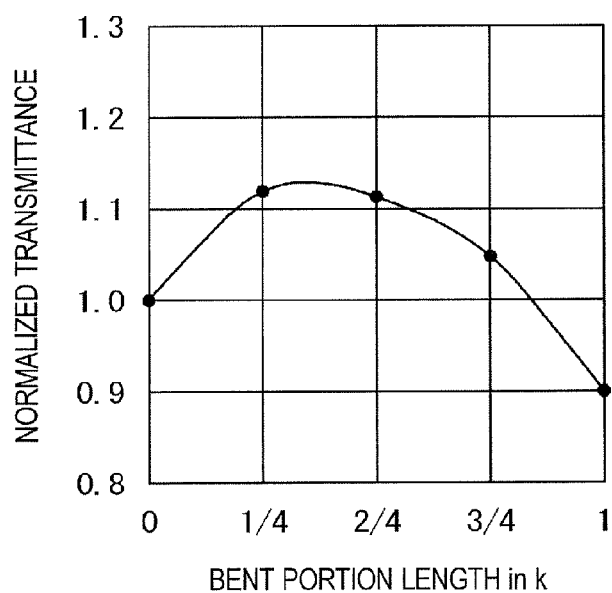
FIG. 10 is a graph illustrating dependence of transmittance on a length of a bent portion in the pixel end portion.

FIG. 10 illustrates dependence of transmittance on a length of the bent portion at the end portion of the pixel. Normalized transmittance is transmittance normalized without the bent portion. Assume that a distance k is a distance between the center (the center of the small wall 15) in the short side direction of the pixel and the side surface of the large wall. In the case where the bent portion has a length of k/4, the normalized transmittance became significantly higher than that without the bent portion. In the case where the bent portion has a length equal to or more than 3k/4, the normalized transmittance was decreased. Accordingly, it is important that the bent portion 30 has a length equal to or more than a length without generation of the domain and equal to or less than a length without increase of a dark region. That is, a length L of the bent portion is preferred to be in a range of k/4<L<3k/4. The length of the bent portion within this range reduces the domain and the dark region at the same time. This ensures high transmittance at the end portion of the pixel, thus ensuring high transmittance of the whole pixel.

TABLE 1

EFFECT OF REDUCTION IN DOMAIN ACCORDING TO PRESENT INVENTION

| BENT PORTION | DOMAIN | DARK REGION |
| --- | --- | --- |
| NONE | LARGE | SMALL |
| SHORT | SMALL | SMALL |
| LONG | SMALL | LARGE |

Figure 11:
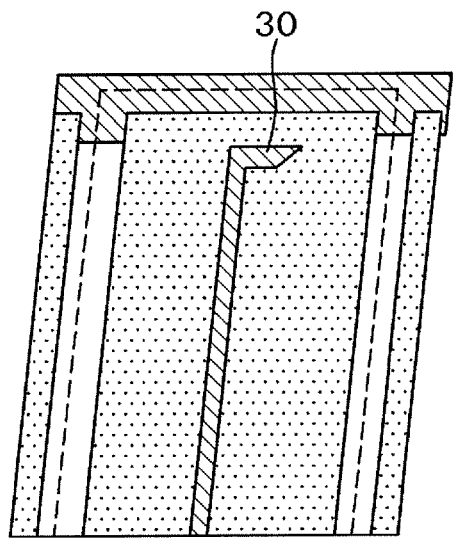
FIG. 11 is a diagram illustrating an exemplary shape of a distal end of the bent portion in a common electrode.
Figure 12:
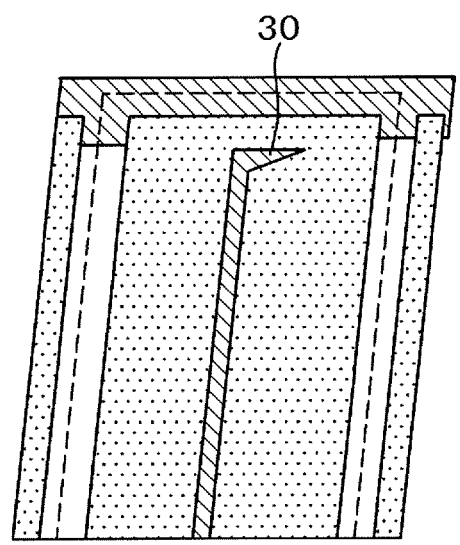
FIG. 12 is a diagram illustrating another exemplary shape of a distal end of the bent portion in the common electrode.
Figure 13:
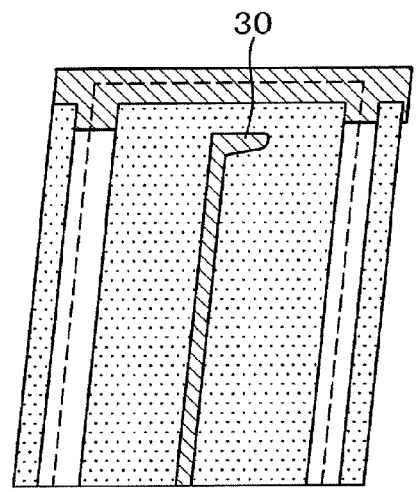
FIG. 13 is a diagram illustrating another exemplary shape of a distal end of the bent portion in the common electrode.

FIG. 11, FIG. 12, and FIG. 13 illustrate exemplary shapes of the distal end of the bent portion in the common electrode. FIG. 11 illustrates the bent portion with the distal end shaped in an acute angle. FIG. 12 illustrates the bent portion with the distal end shaped in an acuter angle. FIG. 13 illustrates the bent portion with the distal end shaped in a round shape. Any of these shapes provides effects of reduction in domain. Therefore, this ensures compatibility between the reduction in domain and the reduction in the dark region, thus achieving high transmittance in the pixel end portion.

As described above, the present invention ensures facilitated enclosing of the liquid crystal, reduction of the parasitic capacitance to the drain line and the gate line, reducing increase in the number of layers, and reducing influence of the electric potential of the adjacent pixel, and ensures compatibility between the reduction in the domain in the pixel end portion and the reduction in the dark region, thus achieving high transmittance of the whole pixel.

Embodiment 2

Figure 15:
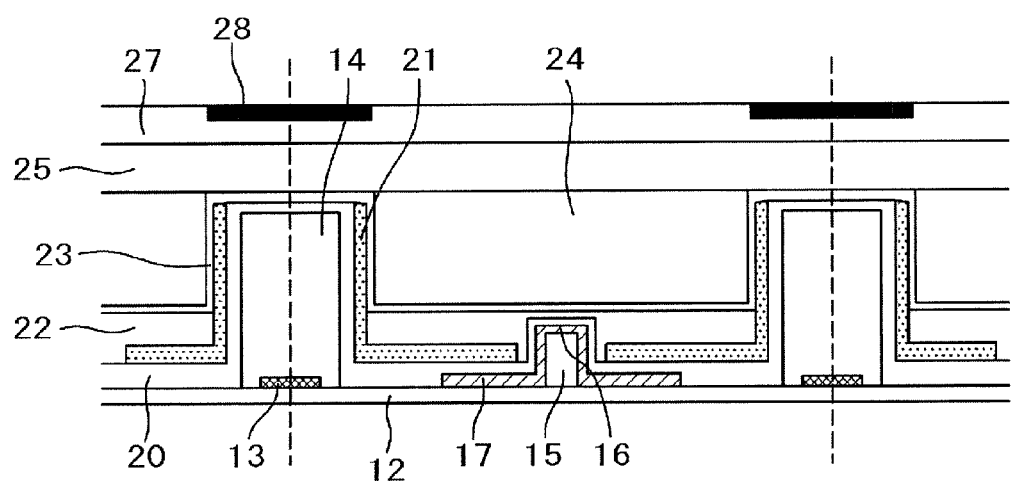
FIG. 15 is a cross-sectional view of a pixel structure according to Embodiment 2 of the present invention.

FIG. 15 illustrates a cross-sectional view of the pixel according to Embodiment 2 of the present invention. While in Embodiment 1, the CF-side electrode 26 is arranged to form the pseudo wall electrode, Embodiment 2 does not include the CF-side electrode 26. This embodiment also ensures facilitated enclosing of the liquid crystal, reduction of the parasitic capacitance to the drain line and the gate line, reducing increase in the number of layers, and reducing influence of the electric potential of the adjacent pixel, and ensures compatibility between the reduction in the domain in the pixel end portion and the reduction in the dark region, thus achieving high transmittance of the whole pixel.

What is claimed is:

1. A liquid crystal display device comprising:
a plurality of pixels arranged in a matrix, each of the pixels including:
   large walls that extend in a long-side direction of the pixel at both ends of the pixel;
   a first small wall that extends parallel to the large walls between the large walls, the first small wall having a height lower than the large walls;
   a TFT-side electrode formed on the first small wall; and
   a wall electrode formed on a side surface of the large wall and formed in plane between the large wall and the first small wall;
wherein the large walls are separated between the pixels in the long-side direction; and
a second small wall which has a height lower than the large walls is arranged between the separated large walls;
wherein the TFT-side electrode and the wall electrode do not exist under the first small wall.

2. The liquid crystal display device according to claim 1, wherein each of the pixels includes the second small wall that is continuously arranged at the both ends of the pixel, the second small wall extending in a short-side direction of the pixel.

3. The liquid crystal display device according to claim 2, further comprising:
a drain line in the long-side direction of the pixel and a gate line in the short-side direction of the pixel; and
a common electrode formed via the second small wall in an upper layer of the drain line and the gate line.

4. The liquid crystal display device according to claim 3, wherein the common electrode is coupled to the common electrodes of adjacent pixels in the short-side direction and the long-side direction of the pixel.

5. The liquid crystal display device according to claim 1, further comprising:
a common electrode formed on a gate line in a short-side direction of the pixel via an interlayer insulating film.

6. The liquid crystal display device according to claim 1, further comprising:
a storage capacitor electrode that faces a planar electrode across an interlayer insulating film to form a capacitive element, the storage capacitor electrode being coupled to the TFT-side electrode and formed in a planar direction of a substrate, the planar electrode extending in a planar direction of a substrate from the wall electrode.

7. A liquid crystal display device comprising:
a plurality of pixels arranged in a matrix, each of the pixels including:
   large walls that extend in a long-side direction of the pixel at both ends of the pixel;
   a first small wall that extends parallel to the large walls between the large walls, the first small wall having a height lower than the large walls;
   a TFT-side electrode formed on the first small wall as a common electrode;
   a wall electrode formed on a side surface of the large wall and formed between the large wall and the first small wall as a source electrode; and
   a bent portion formed in an end portion of the first small wall, the bent portion facing the large wall;
wherein the common electrode is formed in the bent portion;
wherein the common electrode and the source electrode are not formed under the first small wall;
wherein the large walls are separated between the pixels in the long-side direction; and
wherein a second small wall, which has a height lower than the large walls, exists between the separated large walls.

8. The liquid crystal display device according to claim 7, wherein the bent portion includes a distal end with a shape in an acute angle or a round shape.

9. The liquid crystal display device according to claim 7, wherein a distance between the large wall and the first small wall is defined as k, and
the bent portion has a length L that is defined by $k/4 < L < 3k/4$.

10. The liquid crystal display device according to claim 7, further comprising:
a storage capacitor electrode that faces a planar electrode across an interlayer insulating film to form a capacitive element, the storage capacitor electrode being coupled to the TFT-side electrode and formed in a planar direction of a substrate, the planar electrode extending in a planar direction of a substrate from the wall electrode.

11. The liquid crystal display device according to claim 7, further comprising:
a common electrode formed on a gate line in a short-side direction of the pixel via an interlayer insulating film.

12. The liquid crystal display device according to claim 7, further comprising:
a drain line in the long-side direction of the pixel and a gate line in a short-side direction of the pixel; and
a common electrode formed via the second small wall in an upper layer of the drain line and the gate line.

13. The liquid crystal display device according to claim 1, wherein the second small wall extends in the short-side direction of the pixel transversely to the extension direction of the large wall and the first small wall.

14. The liquid crystal display device according to claim 7, wherein the second small wall extends in the short-side direction of the pixel transversely to the extension direction of the large wall and the first small wall.

* * * * *